US012604811B1

(12) United States Patent
Nelson

(10) Patent No.: US 12,604,811 B1
(45) Date of Patent: Apr. 21, 2026

(54) TRUCK BED LOADER

(71) Applicant: Justin Morgan Nelson, Townsend, MT (US)

(72) Inventor: Justin Morgan Nelson, Townsend, MT (US)

( * ) Notice: Subject to any disclaimer, the term of this patent is extended or adjusted under 35 U.S.C. 154(b) by 0 days.

(21) Appl. No.: 19/312,065

(22) Filed: Aug. 27, 2025

(51) Int. Cl.
  *A01D 90/08* (2006.01)
  *A01D 87/12* (2006.01)

(52) U.S. Cl.
  CPC ........... *A01D 90/08* (2013.01); *A01D 87/127* (2013.01)

(58) Field of Classification Search
  CPC ......... A01D 90/08; A01D 87/127; B60P 1/48; B60P 1/4421; B60P 1/4442; B60P 1/483; B60P 1/00; B66F 9/12; B66F 9/065
  USPC ........................................ 414/24.5, 24.6, 111
  See application file for complete search history.

(56) References Cited

U.S. PATENT DOCUMENTS

| | | | | | |
|---|---|---|---|---|---|
| 2,295,917 | A | * | 9/1942 | Schwan | A01D 87/08 |
| | | | | | 414/718 |
| 3,669,293 | A | * | 6/1972 | Bryan | B66C 1/68 |
| | | | | | 414/733 |
| 4,128,179 | A | | 12/1978 | Gilbert | |
| 4,179,034 | A | | 12/1979 | Van Antwerp | |
| 4,412,768 | A | | 11/1983 | Bauer et al. | |
| 4,594,041 | A | | 6/1986 | Hostetler | |
| 5,129,775 | A | * | 7/1992 | Coats | A01D 87/127 |
| | | | | | 414/920 |
| 5,975,832 | A | | 11/1999 | Winkler | |
| 6,530,740 | B2 | * | 3/2003 | Kim | B62B 1/002 |
| | | | | | 414/490 |
| 8,297,904 | B1 | * | 10/2012 | Schroeder | B66F 9/165 |
| | | | | | 414/471 |
| 10,946,884 | B2 | * | 3/2021 | Simpson | B66F 9/065 |
| 2007/0031216 | A1 | | 2/2007 | Wilson | |
| 2007/0166138 | A1 | | 7/2007 | Brookis | |
| 2021/0094807 | A1 | * | 4/2021 | Fox | B66F 9/18 |

FOREIGN PATENT DOCUMENTS

| | | |
|---|---|---|
| CA | 2226913 A1 | 3/1999 |
| WO | WO 2009/015443 A1 | 2/2009 |
| WO | WO 2009/055837 A1 | 5/2009 |

OTHER PUBLICATIONS

Gooseneck 12v Hydraulic Truck 2 Spear Haybale Mover Source: https://hayspear.com/gooseneck-12v-hydraulic-truck-2-spear-haybale-mover/.
Ford F350 Ranch Truck With Cannonball Bale Bed in Action Source: https://www.youtube.com/watch?v=2sRM/W8Xxm0.

* cited by examiner

*Primary Examiner* — Gregory W Adams
(74) *Attorney, Agent, or Firm* — Antoinette M. Tease

(57) ABSTRACT

A truck bed loader including a frame that is configured to fit within a bed of a pickup truck. The frame has a first side rail and a second side rail that are parallel to each other, and the front ends of the first and second side rails are connected by a cross rail. The frame also has a first vertical post and a second vertical post. The first vertical post is connected to the rear end of the first side rail at a ninety-degree angle, and the second vertical post is connected to the rear end of the second side rail at a ninety-degree angle. A first main arm is rotatably attached to a top end of the first vertical post, and a second main arm is rotatably attached to a top end of the second vertical post. A first pair of hydraulic cylinders is configured to lift and lower the first and second main arms. A second pair of hydraulic cylinders controls various attachments to the distal ends of the first main arms.

7 Claims, 13 Drawing Sheets

TRUCK BED LOADER

1. FIELD OF THE INVENTION

The present invention relates generally to the field of loading equipment, and more particularly, to a loader that is specifically adapted to fit on a truck bed.

2. DESCRIPTION OF THE RELATED ART

The management of small hay lease properties often results in haystacks at various locations. Transporting equipment between these sites to pick up hay is time-consuming and inefficient. Moving a tractor with a hay loader attachment can take hours and requires a second person for transportation logistics. The present invention provides a solution that makes loading hay and other heavy objects a one-person job, while simultaneously reducing the need for multiple pieces of equipment. There are other inventions that address various vehicle-related lifting systems, but none that incorporates the structural features or provides the functional advantages of the present invention.

U.S. Patent Application Pub. No. 2007/0166138 (Brooks) describes a collapsible electrical or hydraulic lifting system that is mountable in the bed of a pickup truck. The invention includes attachments such as a forklift, hay bale spear, pallet fork, man-lift cage, etc. The lifting system has a sub-structure comprised of a plurality of beams that are removably secured to the truck bed, at least one pivotal connection secured to the sub-structure, a mast, a track along the mast, a carriage mounted on the track and configured to move along the track, and at least one working attachment. The mast is pivotally movable between an upright and a collapsed position.

U.S. Pat. No. 4,594,041 (Hostetler, 1986) discloses a truck bed bale lift that is configured to lift large round bales of hay onto a flat bed truck. The bale lift assembly includes a pair of rotatable hugger arms that are configured to grip the hay bale. The hugger arms are mounted on a rotatable crossbar that is pivotally mounted to the rear of the truck and controlled by a pneudraulic ram situated underneath the flatbed. The lift is not mounted on a pickup truck, nor is it mounted within a pickup truck bed. Instead, it is mounted on the rear edge of the trailer. When not in use, the hugger arms function as continuations of the side rails on the upper surface of the flatbed.

U.S. Pat. No. 4,128,179 (Gilbert, 1978) provides a bale loader apparatus comprised of a first frame section that is semi-permanently mounted on a truck and a second frame section that is demountable and to which the remainder of the bale loader apparatus is attached. A boom is pivotally attached to the frame, and a rigid connecting member is pivotally attached to the boom at one end and pivotally attached to a bale fork at the other end. A roller is configured to support the weight of the rigid connecting member, bale fork and a hay bale. The invention includes a means for controlling the angular position of the bale fork relative to the rigid connecting member and means for rotating the boom about the pivotal attachment to the frame.

U.S. Pat. No. 5,975,832 (Winkler, 1999) discloses a bale handling apparatus comprising a wheeled flat bed trailer and a rotatable articulating arm with a bale lifting mechanism that is rotatably and pivotally attached to the rotatable articulating arm. The articulating arm has a rotatable substantially vertical mast portion and a boom portion. The vertical mast portion has a stationary post and a sleeve that is rotatable about the stationary post. The boom portion is pivotally attached to the rotatable sleeve on the vertical mast portion. First and second elongated beams are pivotally attached to the rotatable sleeve, and one end of the first elongated beam is pivotally attached near a first end of the second elongated beam. A bale lifting mechanism is rotatably and pivotally attached at a second end of the second elongated beam. A drive assembly is configured to rotate the rotatable sleeve with respect to the stationary post.

U.S. Pat. No. 4,412,768 (Bauer et al., 1983) provides a truck bumper incorporating a hay handling device. The invention is a hydraulically powered unit that serves as a rear truck bumper and a bale carrier for large cylindrical hay bales. The invention is comprised of a rear bumper, a frame for carrying the rear bumper, means for connecting the bumper to the frame so that the bumper can pivot between a normal position and a bale carrying position, power means for effecting the pivotal movement of the bumper, and a pair of spears. The spears are removably connected to the bumper and spaced apart to extend generally horizontally to the rear of the bumper in the normal position. The spears extend vertically above the bumper when it is in the bale carrying position.

U.S. Pat. No. 4,179,034 (Van Antwerp et al., 1979) discloses a bale loader that is designed for use with a pickup truck. The loader has a frame assembly that slides into and out of the pickup truck bed. The bale fork portion of the loader can be used with the pickup truck frame assembly or with a standard three-point tractor hitch. The frame assembly has a rear transverse frame member that is positioned along the rear edge of the truck bed, a front transverse frame member that is positioned toward the front end oft eh truck bed, and a rigid frame means that connects the front and rear frame members. The loader includes means for diagonally interconnecting the front transverse frame member to the sides of the pickup truck and fork means that are mounted to the frame assembly for engaging a bale of hay. Motor means are mounted on the frame assembly and configured to operate the fork means.

U.S. Patent Application Pub. No. 2007/0031216 (Wilson) describes a hay bale loading apparatus comprised of a plurality of grasping arms, first and second actuators, and a frame that is attachable to a pickup truck. The grasping arms are movable by the first actuator and configured to hold a hay bale. The second actuator is configured to cause the grasping arms to move the hay bale radially about the second actuator from the ground to the bed of the pickup truck.

BRIEF SUMMARY OF THE INVENTION

The present invention is a truck bed loader comprising: a frame that is configured to fit within a bed of a pickup truck; wherein the frame is comprised of a first side rail and a second side rail that are parallel to each other; wherein each of the first side rail and the second side rail has a front end and a rear end; wherein the front ends of the first and second side rails are connected by a cross rail; wherein the frame further comprises a first vertical post and a second vertical post; wherein the first vertical post is connected to the rear end of the first side rail at a ninety-degree angle; and wherein the second vertical post is connected to the rear end of the second side rail at a ninety-degree angle; a first main arm that is rotatably attached to a top end of the first vertical post; a second main arm is rotatably attached to a top end of the second vertical post; and a first pair of hydraulic cylinders that is configured to lift and lower the first and second main arms.

In a preferred embodiment, a cross bar extends between the first main arm and the second main arm at a center part of each of the first and second main arms. In another preferred embodiment, a solar panel is disposed between the first and second main arms at a point that is proximate to the top ends of the first and second vertical posts. In yet another preferred embodiment, each of the first and second main arms has a bottom end; and a hay loader attachment is rotatably attached to the bottom ends of the first and second main arms.

In a preferred embodiment, the first main arm is comprised of a first leg and a second leg; wherein the second main arm is comprised of a first leg and a second leg; wherein the first leg is connected to the second leg at a distal end of the first leg and at a proximal end of the second leg; wherein a thickness of the first leg increases from a proximal end of the first leg to the distal end of the first leg; wherein a thickness of the second leg decreases from the proximal end of the second leg to a distal end of the second leg; and wherein the distal ends of the second legs of the first and second main arms are configured to be rotatably attached to various attachments. In another preferred embodiment, the first leg of the first main arm is connected to the second leg of the first main arm at an angle in the range of 100 to 120 degrees; and the first leg of the second main arm is connected to the second leg of the second main arm at the same angle at which the first leg of the first main arm is connected to the second leg of the first main arm. In yet another preferred embodiment, a second pair of hydraulic cylinders is configured to rotate the various attachments.

In a preferred embodiment, the invention further comprises a rear support bar that extends from the top end of the first vertical post to the top end of the second vertical post. In another preferred embodiment, a jack is situated directly behind and welded to the rear support bar; the jack is configured to raise and lower the frame; and the jack comprises a gooseneck coupler, and the jack is positioned over a gooseneck ball on a floor of the truck bed. In yet another preferred embodiment, a central support member extends from a top of the jack to the cross rail.

In a preferred embodiment, the frame further comprises: a first diagonal support member that extends from a first end of the rear support bar to a center of the first side rail; and a second diagonal support member that extends from a second end of the rear support bar to a center of the second side rail. In another preferred embodiment, the invention further comprises a chain and binder that are configured to attach to a rear anchor hook on the cross rail to secure the frame to a trailer hitch on a vehicle. In yet another preferred embodiment, the invention further comprises a remote control handheld device that is connected to an electric-hydraulic pump that is powered by a battery; the solar panel is configured to charge the battery; the remote control handheld device is configured to control the electric-hydraulic pump; and the electric-hydraulic pump is configured to control the first and second pairs of hydraulic cylinders. The battery is preferably situated in a metal tray that is welded to the first side rail of the frame.

REFERENCE NUMBERS

Figure 1:
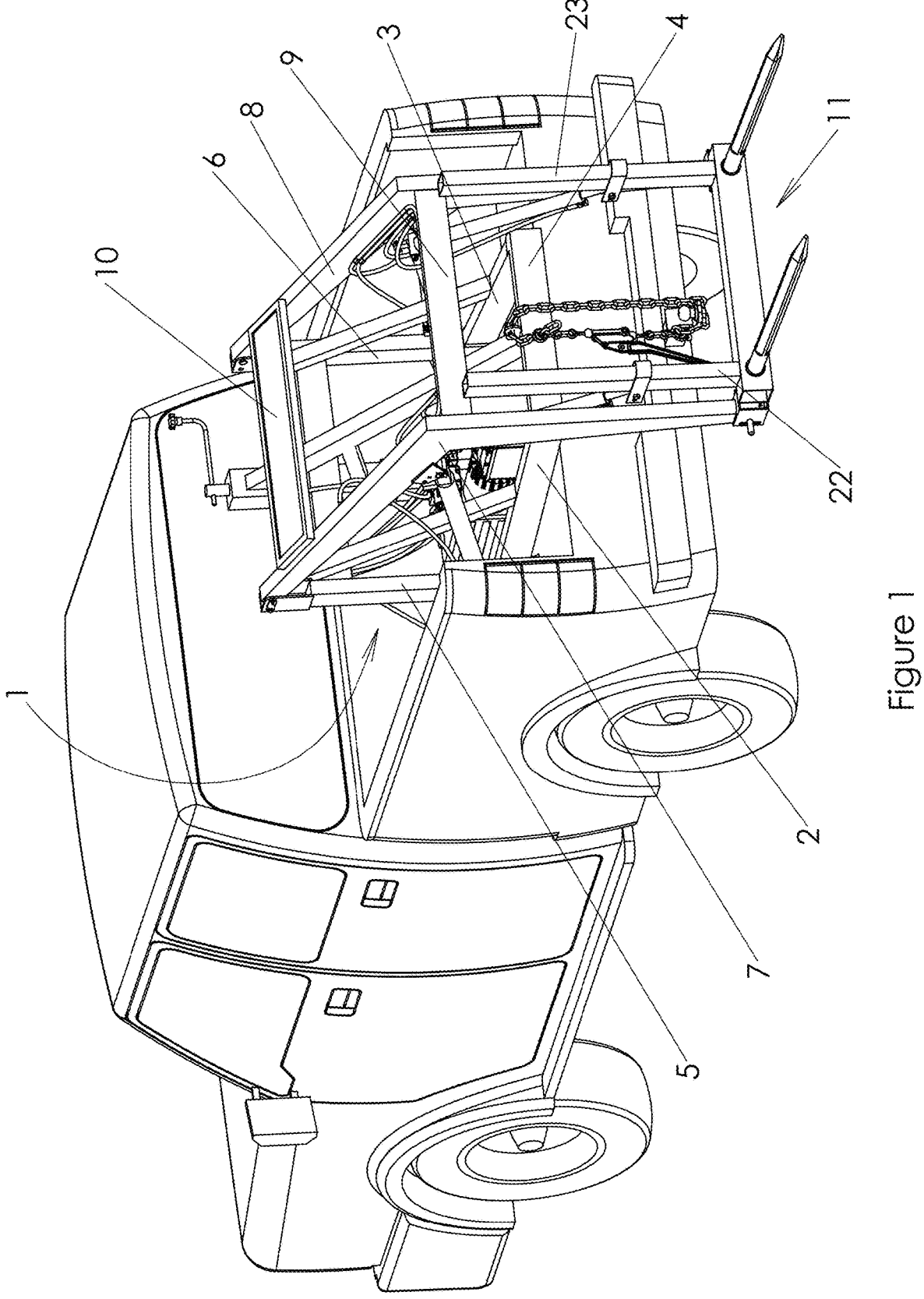
FIG. 1 is a rear perspective view of the present invention installed in the bed of a pickup truck with the main arms in a first position and the hay loader attachment in a first position.

1 Frame
2 First side rail
3 Second side rail
4 Cross rail
5 First vertical post
6 Second vertical post
7 First main arm
8 Second main arm
9 Cross bar
10 Solar panel
11 Hay loader attachment
12 First leg (of main arm)
13 Second leg (of main arm)
14 First pair of hydraulic cylinders
15 Second pair of hydraulic cylinders
16 Rear support bar
17 Jack
18 Central support member
19 Diagonal support member
20 Chain/binder
21 Rear anchor book
22 First attachment member
23 Second attachment member
24 Remote control
25 Electric-hydraulic pump
26 Battery
27 Hydraulic fluid reservoir
28 Bracket
29 Handle (of jack)
30 Gooseneck ball
31 Hinge pin (of jack)
32 Battery tray

DETAILED DESCRIPTION OF INVENTION

A. Overview

The present invention is a loader that attaches to the back of a pickup truck, allowing hay to be transported more efficiently. A tractor loader is a front-mounted hydraulic attachment on a tractor used for lifting, scooping, and transporting materials like hay, dirt, gravel, or manure. It typically consists of a bucket or fork attachment that can be raised, lowered, and tilted for various agricultural and construction tasks. Unlike a tractor, which is limited to around 15 mph, a pickup truck can travel at highway and dirt road speeds, significantly reducing transport time. The loader also enables a bumper pull trailer to be towed on the same vehicle, making it possible for one person to load and move hay independently. During winter feeding, an operator can drive to a hay stack, unhook the trailer, load the necessary bales, reattach the trailer, and continue feeding—all without relying on a tractor, which may be difficult to start in cold weather. This solution is more time- and fuel-efficient, as it consolidates the work into a single vehicle operation.

The present invention is a self-contained unit powered by a 12-volt car battery. It operates using an electric-over-hydraulic system with a remote control that reaches into the truck cab for easy operation. The battery is charged either by a solar panel or through the trailer light plug (typically situated at the rear of the cab), allowing for efficient charging while in use. The loader attaches to any pickup truck with a towing ball in the bed, securing with a standard gooseneck trailer latch that is adjustable to fit both regular and flatbeds. For additional stability, it also secures to the truck's rear bumper using a chain and binder. The loader is designed to load itself into the truck bed under its own power, eliminating the need for another loader to load the invention onto the truck bed. The present invention is highly versatile in that it may be used with different attachments; for example, it can be used to load and unload palletized items, scoop dirt into trucks with a bucket attachment, or serve as a man basket for overhead work on structures or irrigation pivots.

The present invention is easy to operate, and the cost of manufacturing is significantly lower than that of a bale bed. For those just starting a homestead, it offers an affordable solution for handling materials. The main drawback of tractors with loader attachments is that you must purchase the tractor in addition to the loader attachment. With the present invention, a person can convert his truck into a loader in just ten minutes. Unlike a bale bed, the present invention allows the operator to reach the top bale in a hay stack and load or unload trailers-something a bale bed cannot do. Additionally, while bale beds struggle with large square bales, the present invention can easily handle both big square and big round bales. It is important to note that the present invention is not designed to carry a single bale at high speeds. Instead, it is built specifically for loading and unloading materials from a trailer. Overall, the present invention offers a much better price point than a bale bed while providing greater versatility.

B. Detailed Description of the Figures

FIG. 1 is a rear perspective view of the present invention installed in the bed of a pickup truck with the main arm in a first position and the hay loader attachment in a first position. As shown in this figure, the present invention is designed so that it can be loaded within the bed of a pickup truck, but it can also be used with any type of truck bed or trailer that is equipped with a gooseneck coupler (see FIG. 10). The present invention comprises a frame 1 that is configured to be positioned within the truck bed. The frame comprises first and second side rails 2, 3 that are connected to each other by a cross rail 4 at the front end of each side rail. The frame further comprises first and second vertical posts 5, 6 that are connected to the rear end of each side 2, 3 rail at a ninety (90)-degree angle (i.e., the vertical posts are perpendicular to the side rails). A first main arm 7 is rotatably attached to the top end of the first vertical post 5, and a second main arm 8 is rotatably attached to the to pend of the second vertical post 6. A cross bar 9 connects the two main arms 7, 8 to each other at roughly the center of each main arm. A solar panel 10 is preferably disposed between the two main arms 7, 8 at the top ends of the main arms (also referred to herein as the "proximal" ends of the main arms), proximate to the point at which they attach to the vertical posts 5, 6. In the embodiment shown in this figure, a hay loader attachment 11 is rotatably attached to the bottom (or distal) end of each main arm 7, 8. The present invention can be used with other attachments in lieu of the hay loader attachment, for example, a dirt bucket, man basket, or pallet forks. As used herein, "proximal" means closer to the cab of the truck, and "distal" means closer to the tailgate.

Figure 2:
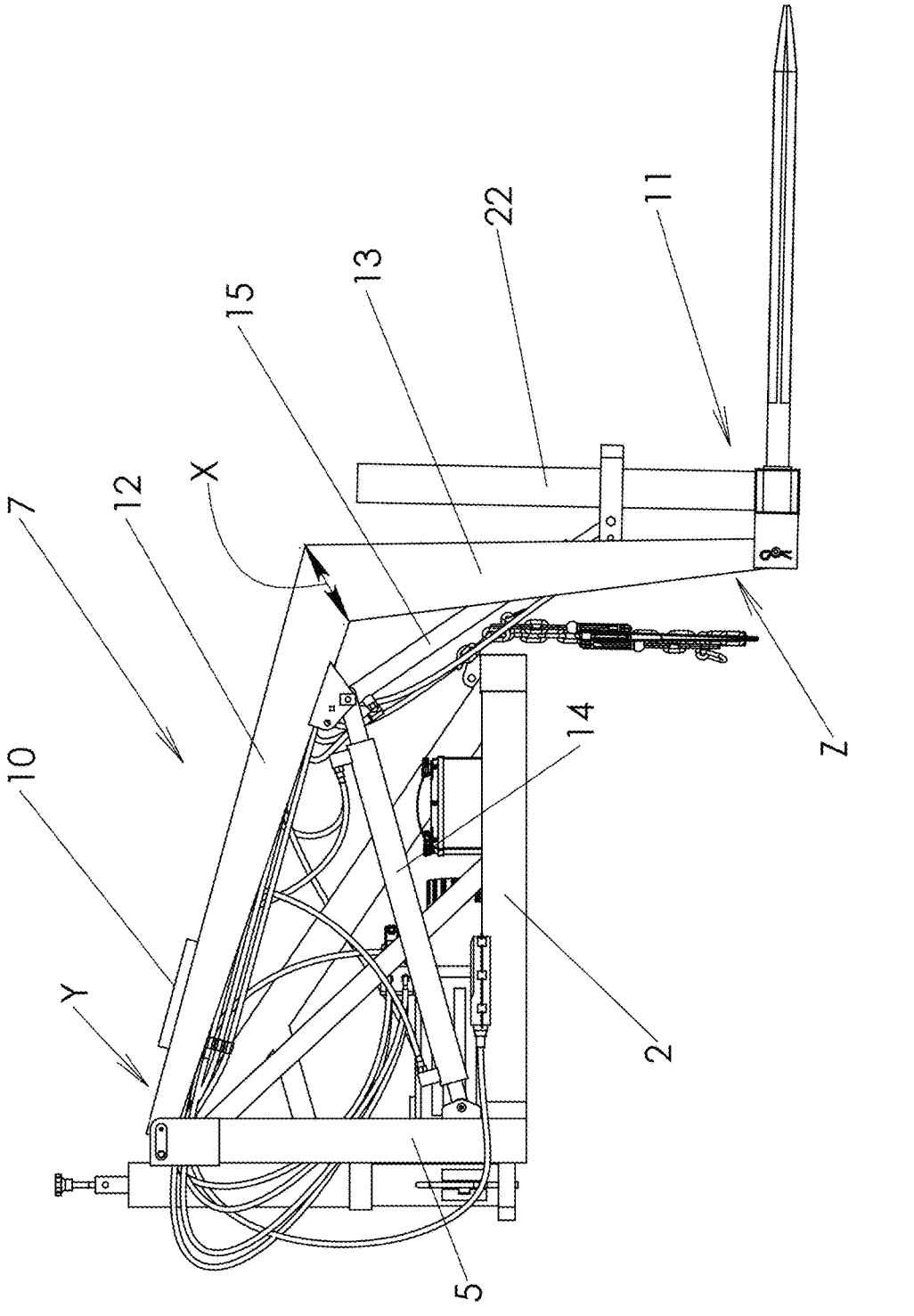
FIG. 2 is a right side view of the present invention with the main arms in a first position and the hay loader attachment in a first position.

FIG. 2 is a right side view of the present invention with the main arm in a first position and the hay loader attachment in a first position. As shown in this figure, each main arm 7, 8 is comprised of a first leg 12 and a second leg 13, the first and second legs being made up of a single piece of metal. Each leg 12, 13 is preferably thicker (measuring from top to bottom) at the center of the main arm (where the two legs join together, designated with an "X" in FIG. 2) than at the opposite ends of each leg (designated with a "Y" and a "Z" in FIG. 2). The first leg 12 is preferably at an angle relative to the second leg 13 such that the second leg 13 tilts more steeply downward than the first leg 12. In a preferred embodiment, this angle is preferably in the range of 110 to 120 degrees (see discussion of FIG. 4 below). A first pair of hydraulic cylinders 14 is configured to lift and lower the main arms, and a second pair of hydraulic cylinders 15 is configured to rotate the hay loader attachment 11 relative to the distal end ("Z") of the second leg 13.

Figure 3:
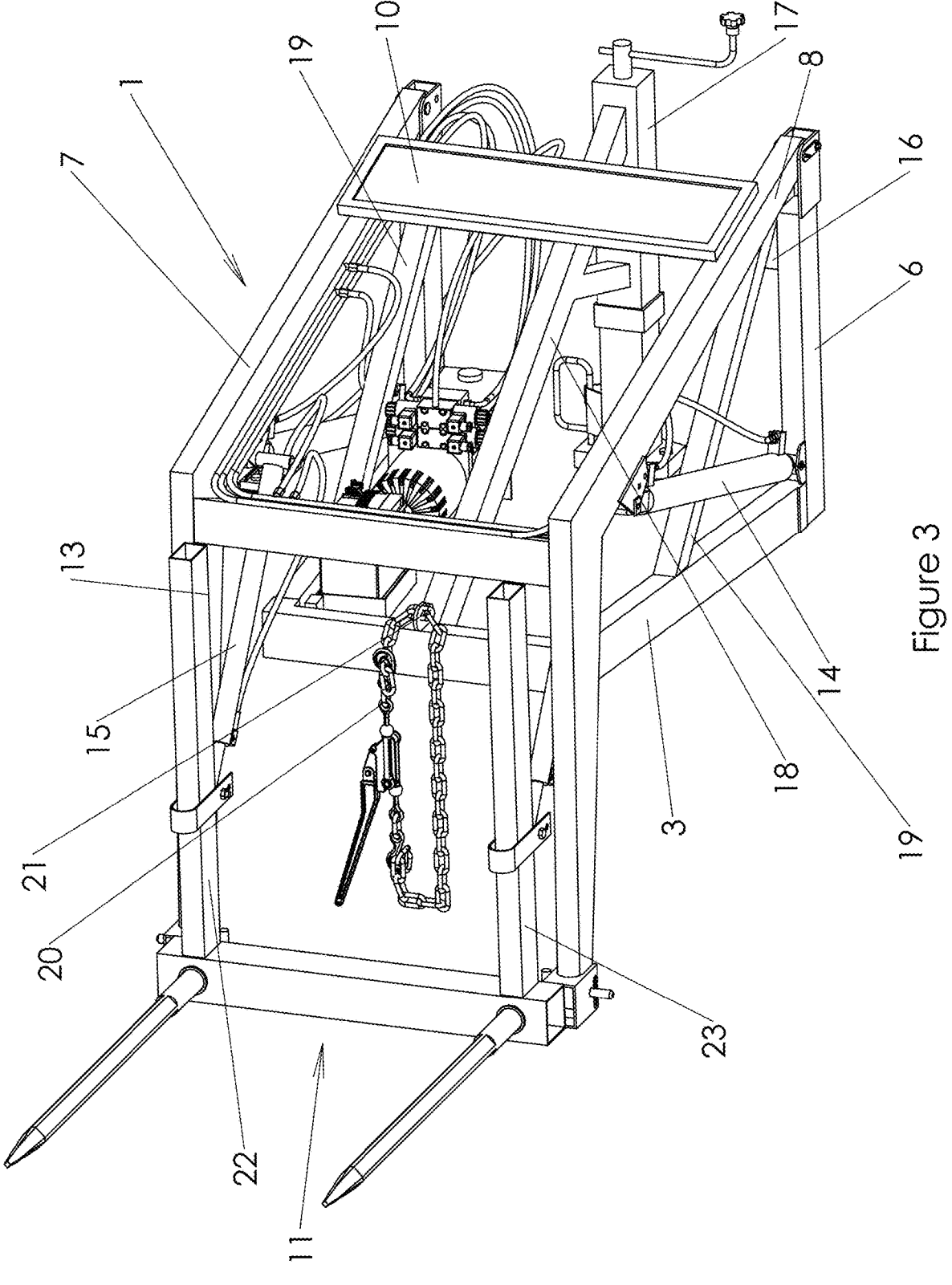
FIG. 3 is a rear perspective view of the present invention with the main arms in a first position and the hay loader attachment in a first position.

FIG. 3 is a rear perspective view of the present invention with the main arm in a first position and the hay loader attachment in a first position. As shown in this figure, the frame 1 further comprises a rear support bar 16 that adjoins the two top ends of the first and second vertical posts 5, 6. A jack 17 is situated directly behind and welded to the rear support bar 16 (see also FIG. 6). A central support member 18 extends from the top of the jack 17 to the cross rail 4 at the bottom front of the frame 1 to provide added support to the overall structure. First and second diagonal support members 19 run from either end of the rear support bar 16 to approximately the center of each side rail 2, 3. A chain and binder 20 attaches to a rear anchor hook 21 and is configured to secure the frame 1 to the trailer hitch on the vehicle.

Figure 4:
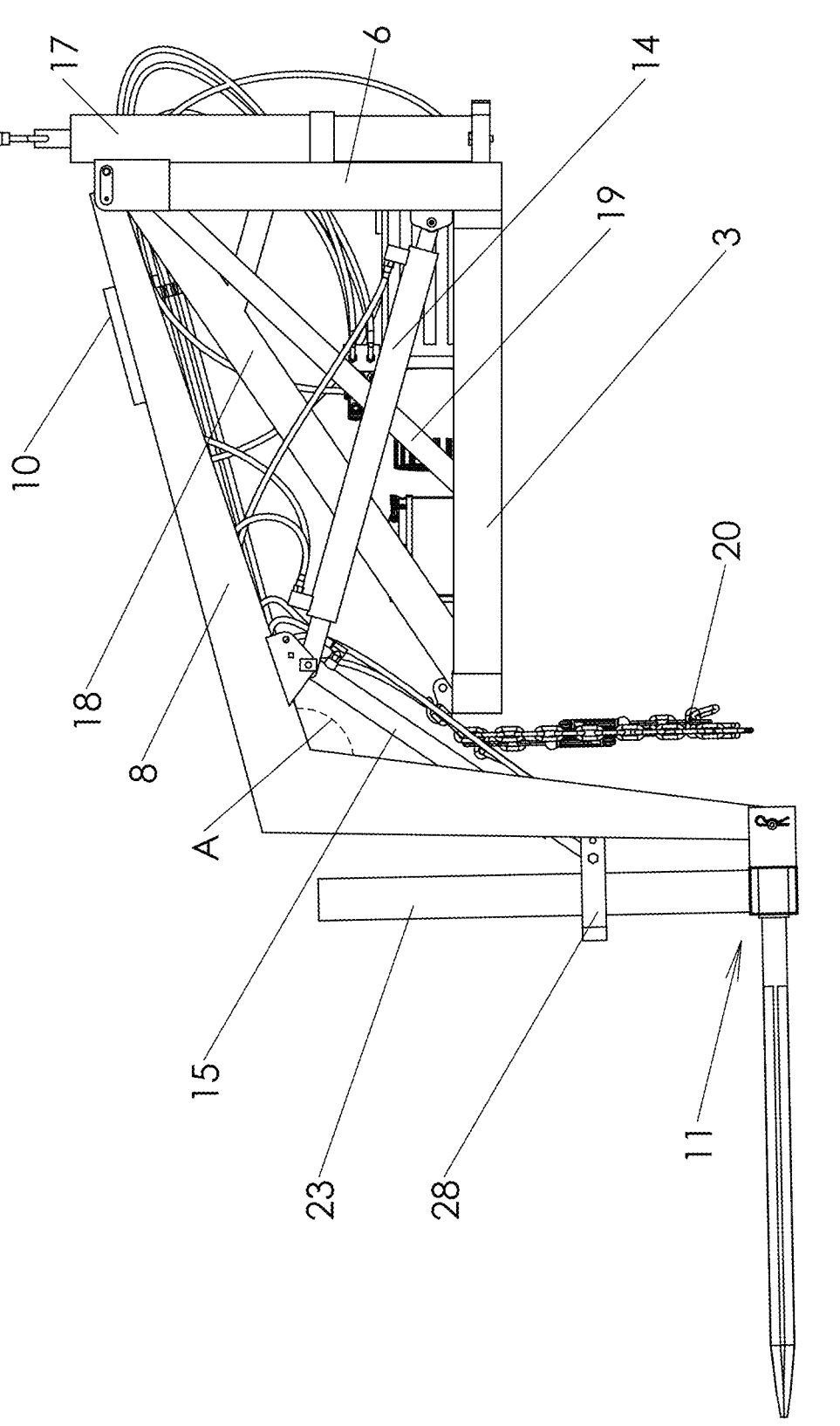
FIG. 4 is a left side view of the present invention with the main arms in a first position and the hay loader attachment in a first position.

FIG. 4 is a left side view of the present invention with the main arms in a first position and the hay loader attachment in a first position. As shown in this figure (and noted above), the central angle of the main arm 8 is preferably in the range of 110 to 120 degrees. In the embodiment shown in these figures, this angle (designated with an "A" in FIG. 4) is approximately 116 degrees. This angle is the same on both main arms 7, 8. First and second attachment members 22, 23 are part of the hay loader attachment 11. These attachment members 22, 23 serve as points of attachment for the second pair of hydraulic cylinders 15 (see also FIG. 1). The second pair of hydraulic cylinders 15 are connected to the attachment members 22, 23 with brackets 28. Note that the hay loader attachment 11 is removably attached to the distal end of the main arms 7, 8 so that different attachments can be used. To remove the hay loader attachment 11, one would simply un-bolt the brackets 28 and slide the hay loader attachment off of the main arms 7, 8.

Figure 5:
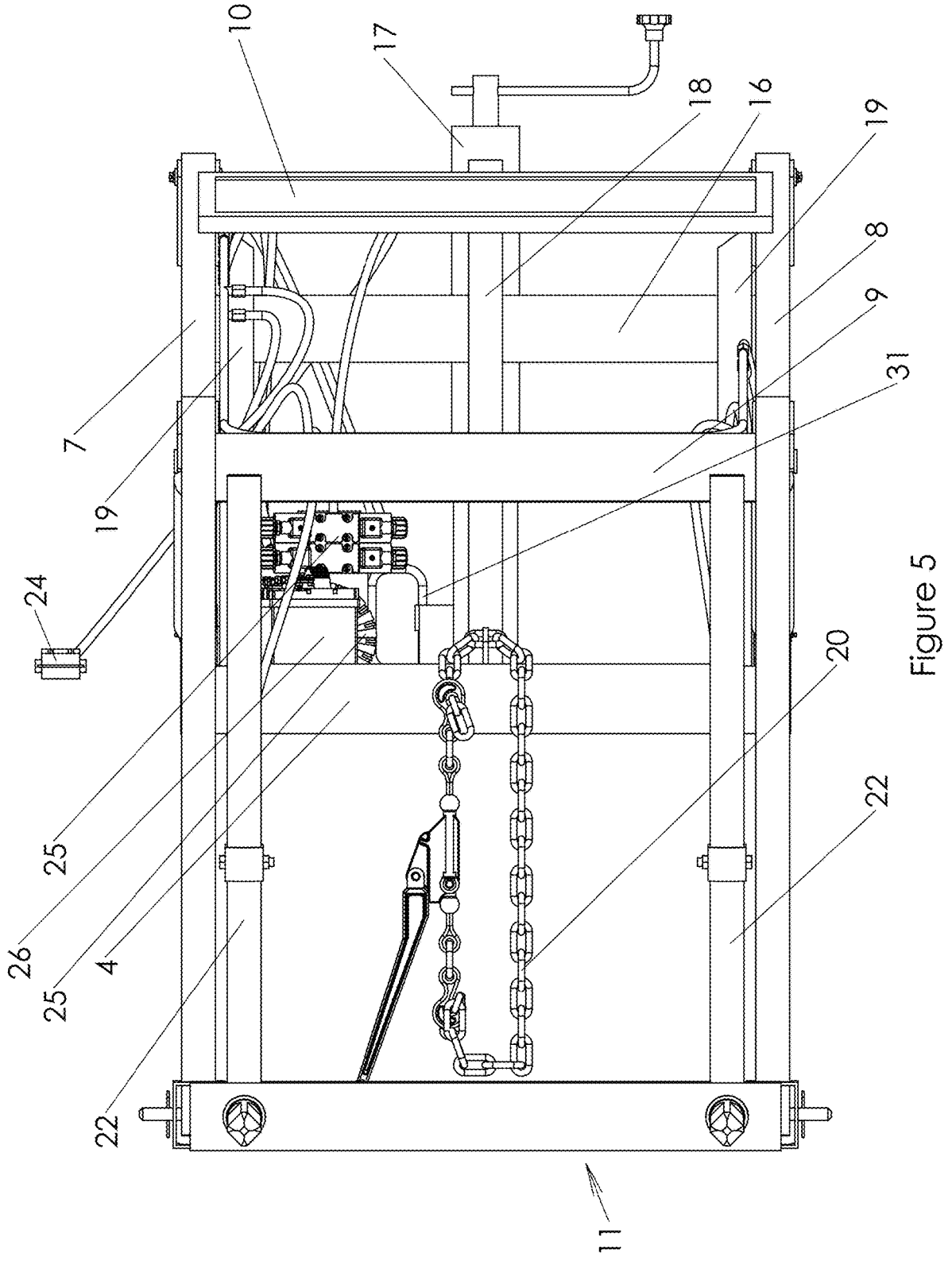
FIG. 5 is a rear view of the present invention with the main arms in a first position and the hay loader attachment in a first position.
Figure 11:
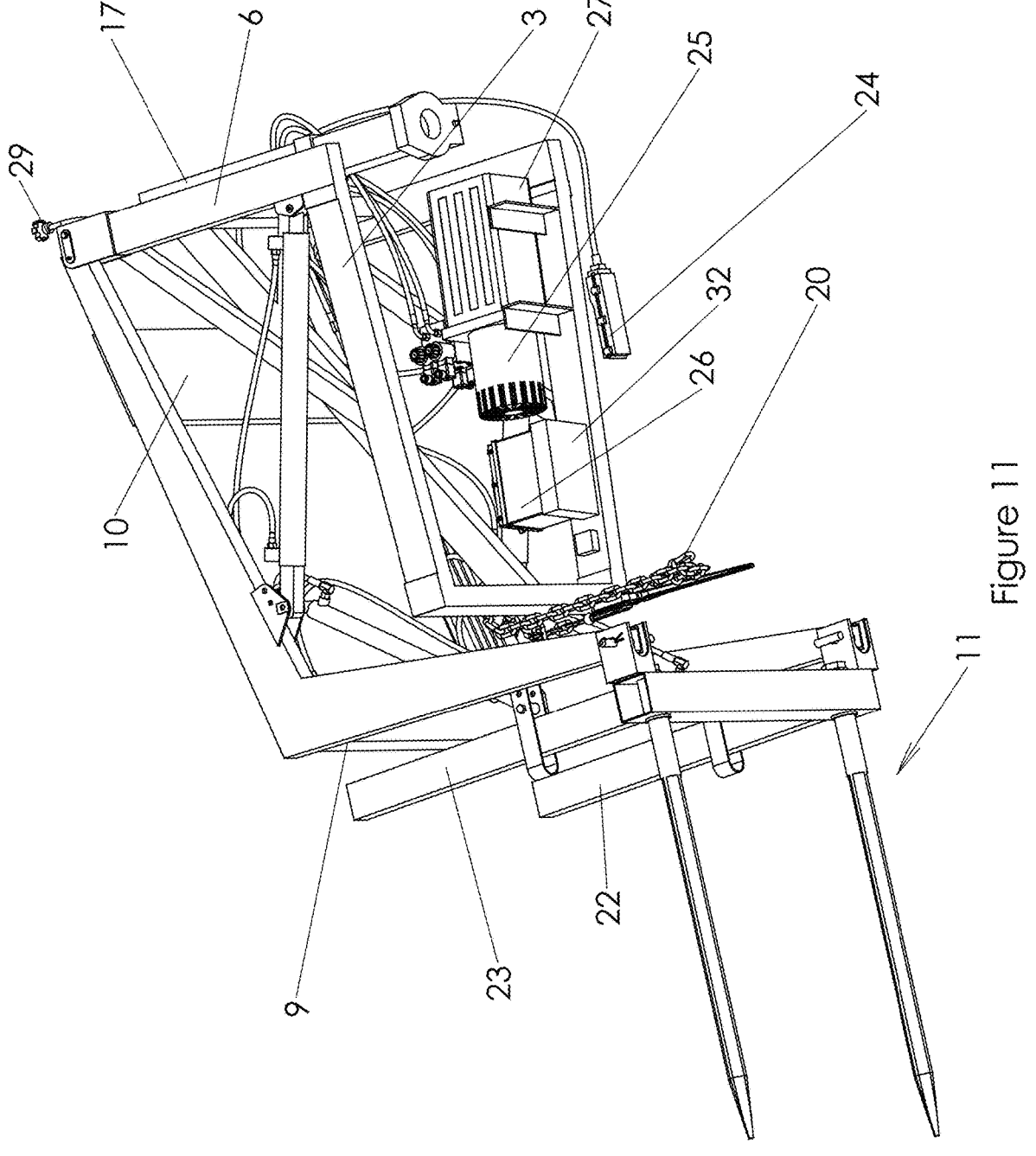
FIG. 11 is a bottom perspective view of the present invention.

FIG. 5 is a rear view of the present invention with the main arms in a first position and the hay loader attachment in a first position. As shown in this figure, a remote control handheld device 24 is preferably connected to an electric-hydraulic pump 25, which is powered by a battery 26. In a preferred embodiment, the battery 26 is a 12-volt car battery and is charged by the solar panel 10 or the trailer light plug. The remote control handheld device is configured to control the electric-hydraulic pump 25, and the electric-hydraulic pump 25 is configured to control the first pair of hydraulic cylinders 14 and the second pair of hydraulic cylinders 15. The battery is preferably situated in a metal tray 32 that is welded to the first side rail 2 of the frame (see FIG. 11).

Figure 6:
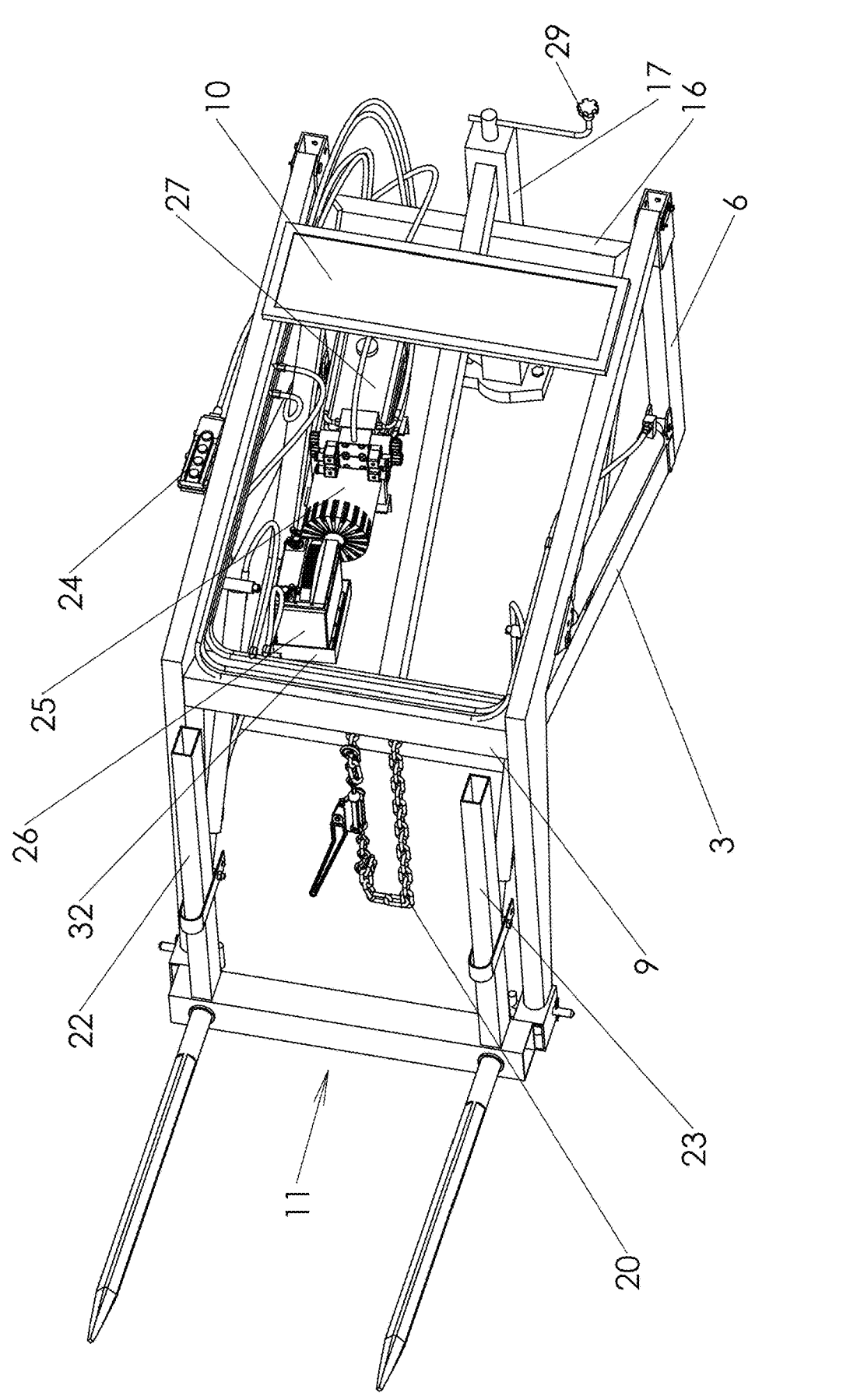
FIG. 6 is top perspective view of the present invention with the main arms in a first position and the hay loader attachment in a first position.

FIG. 6 is top perspective view of the present invention with the main arms in a first position and the hay loader attachment in a first position. As shown in this figure, a hydraulic fluid reservoir 27 is preferably situated behind the electric-hydraulic pump 25 and configured to provide hydraulic fluid to the electric-hydraulic pump 25.

Figure 7:
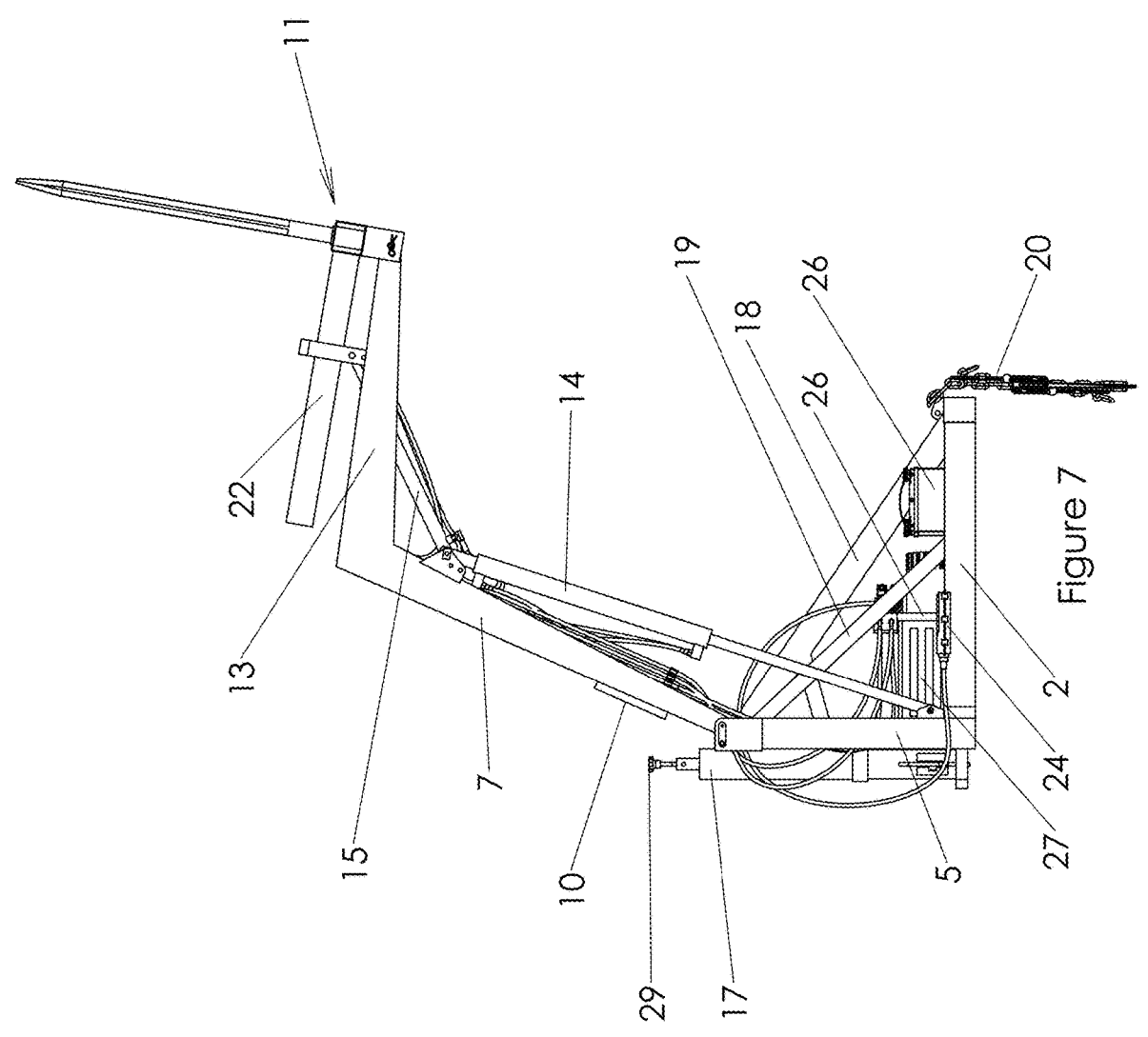
FIG. 7 is a right side view of the present invention with the main arms in a second position and the hay loader attachment in a first position.

FIG. 7 is a right side view of the present invention with the main arms in a second position and the hay loader attachment in a first position. In this figure, the first pair of hydraulic cylinders 14 have been extended to raise the main arms 7, 8.

Figure 8:
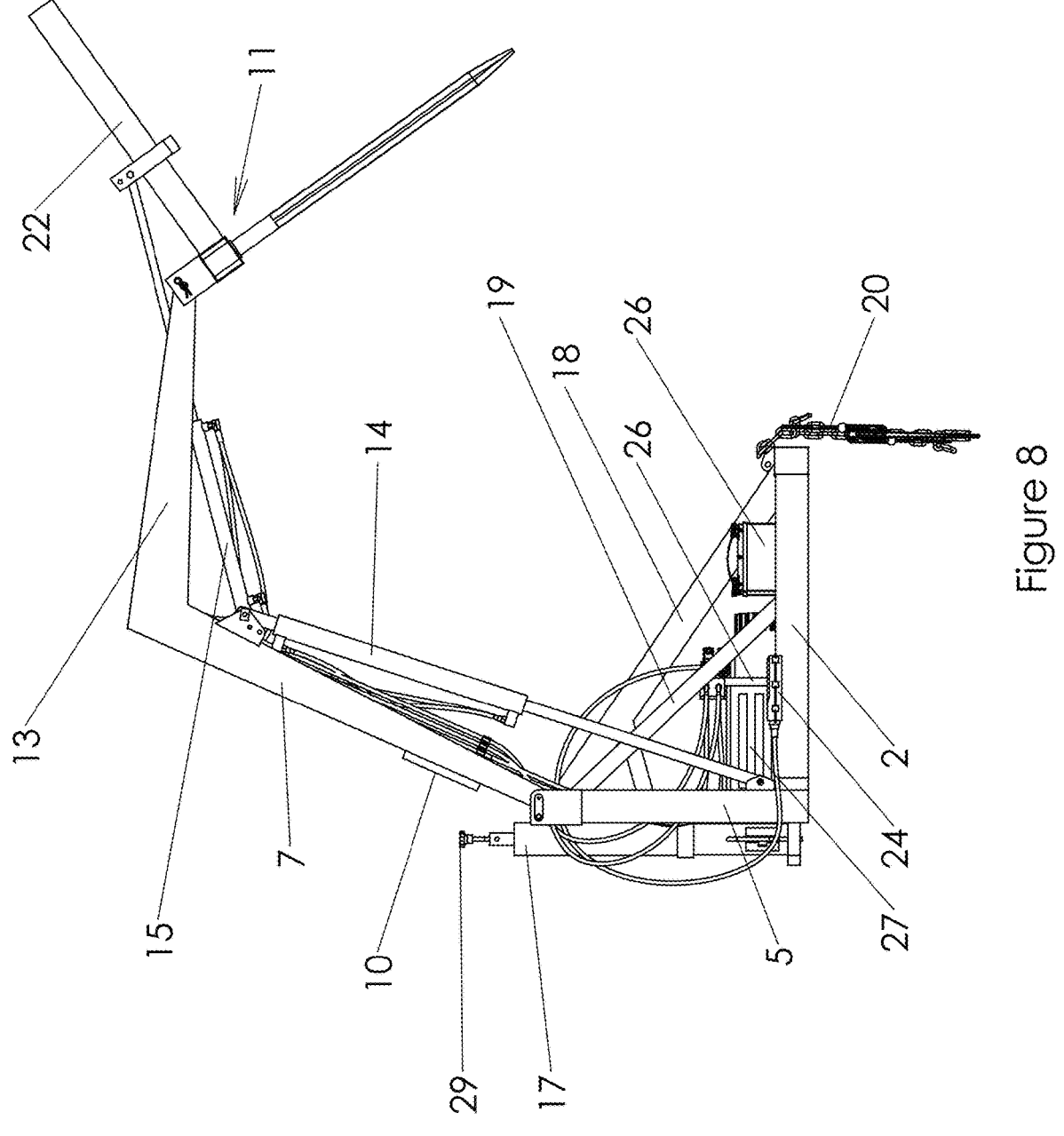
FIG. 8 is a right side view of the present invention with the main arms in a second position and the hay loader attachment in a second position.

FIG. 8 is a right side view of the present invention with the main arms in a second position and the hay loader attachment in a second position. In this figure, the main arms 7, 8 are in the same position as shown in FIG. 7, but the second pair of hydraulic cylinders 15 have been extended to rotate (or tilt) the hay loader attachment 10. As is apparent from FIGS. 7 and 8, by extending and/or retracting the first and second pairs of hydraulic cylinders 14, 15, the invention can be positioned to lift and lower a hay bale or other load, depending on the attachment.

Figure 9:
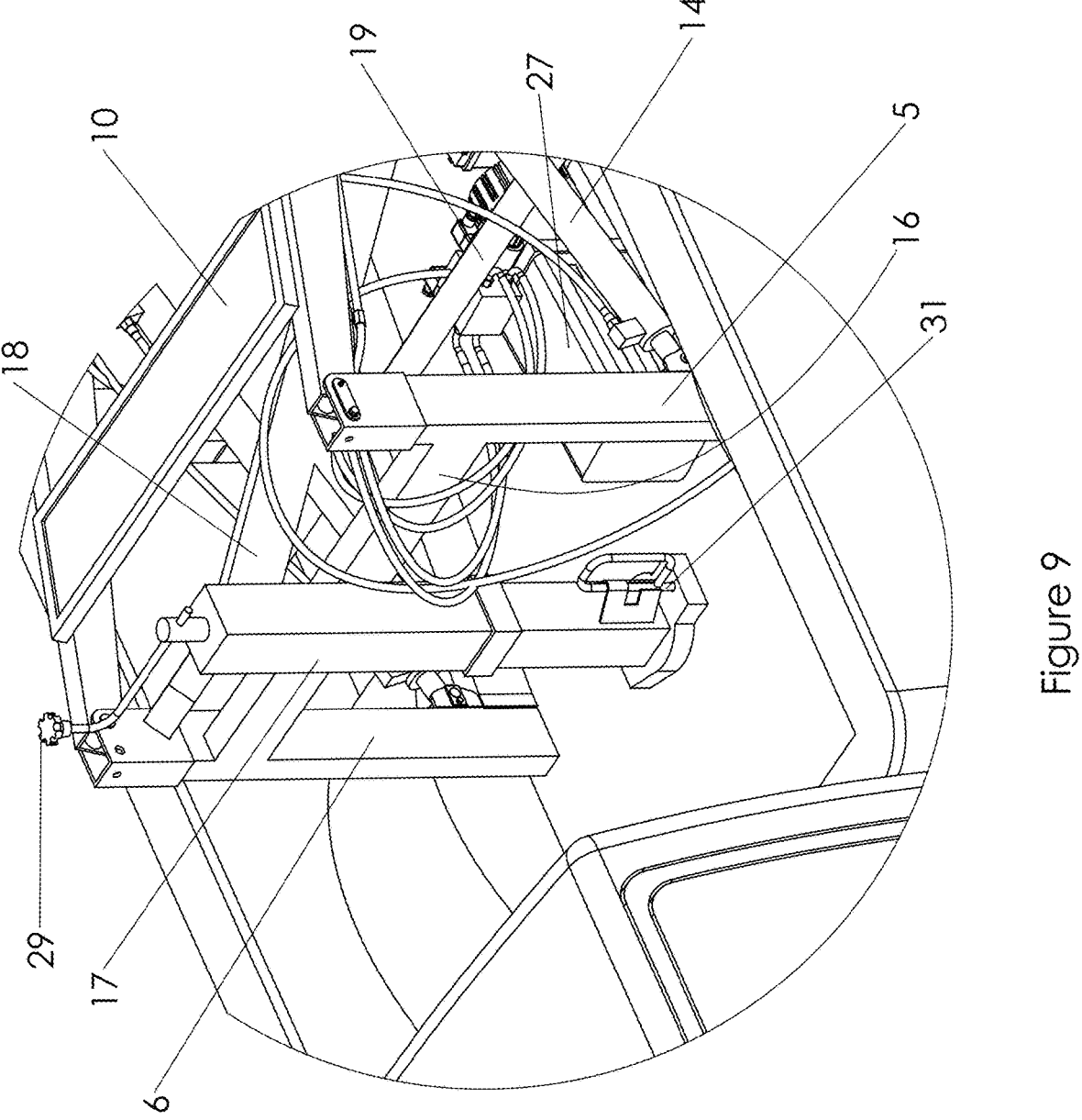
FIG. 9 is a detail view of the jack of the present invention.

FIG. 9 is a detail view of the jack of the present invention. As shown in this figure, the jack 17, which is situated at the rear of the frame 1, is preferably welded to the rear support bar 16 and configured to raise and lower the frame 1 as the operator rotates the handle 29. The jack 17 is preferably manually operated, but an electrically or hydraulically operated jack may also be used.

Figure 10:
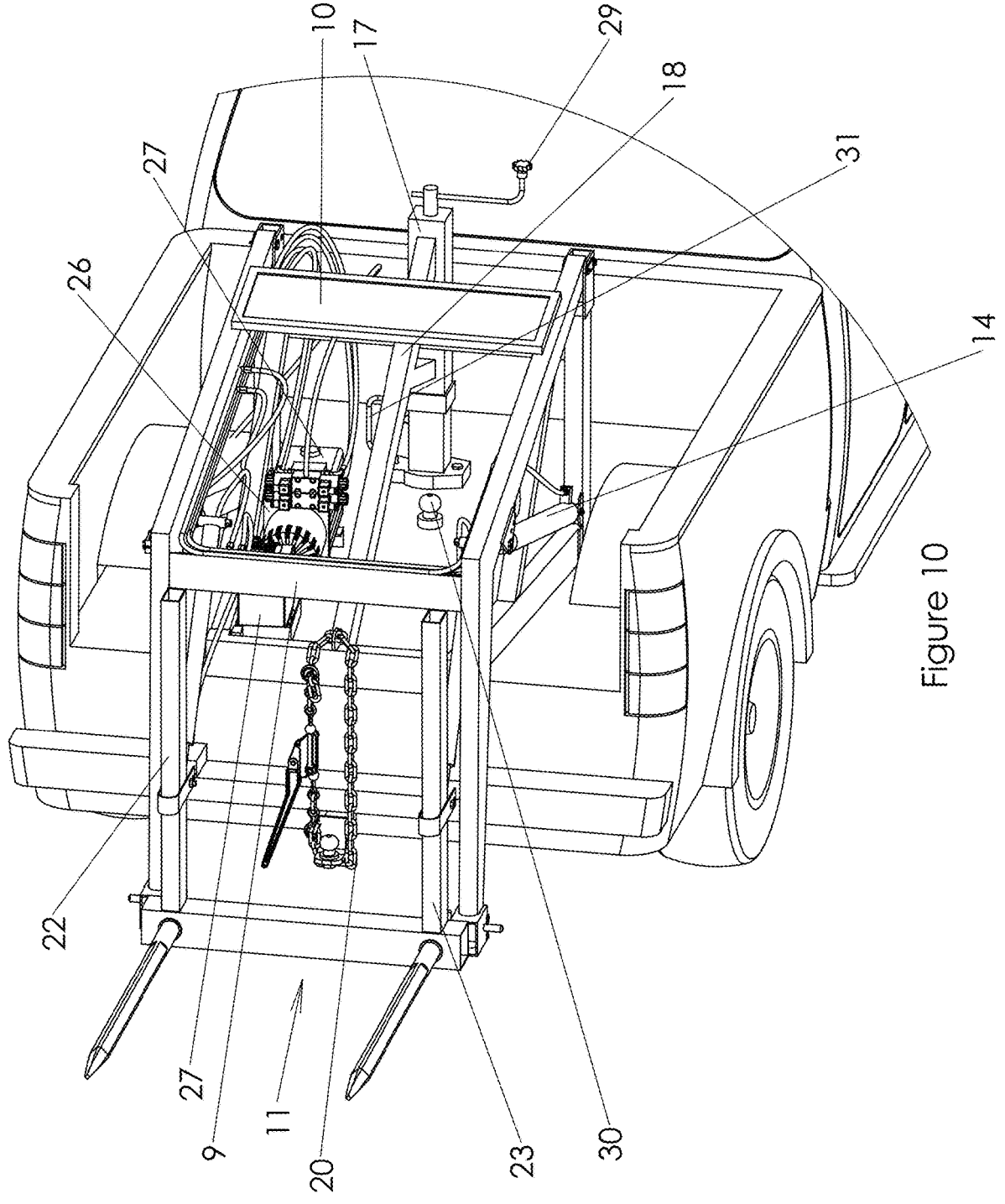
FIG. 10 is a rear perspective view of the present invention installed in the bed of a pickup truck with the frame lifted up off of the gooseneck trailer hitch in the pickup truck bed.

As shown in FIG. 10, the jack 17 is secured to the truck bed via a standard gooseneck coupler. The gooseneck ball 30 is positioned on the floor of the truck bed, in approximately the center of the truck bed. The jack 17 incorporates a latch or locking mechanism (not shown), which can be disengaged by the operator via a hinge pin 31 at the bottom of the jack 17. Disengagement of the gooseneck coupler via the hinge pin 31 enables the jack 17 to be lifted off of the gooseneck ball 30.

Figure 12:
FIG. 12 is a first side view of the present invention shown during the onloading/offloading process.
Figure 13:
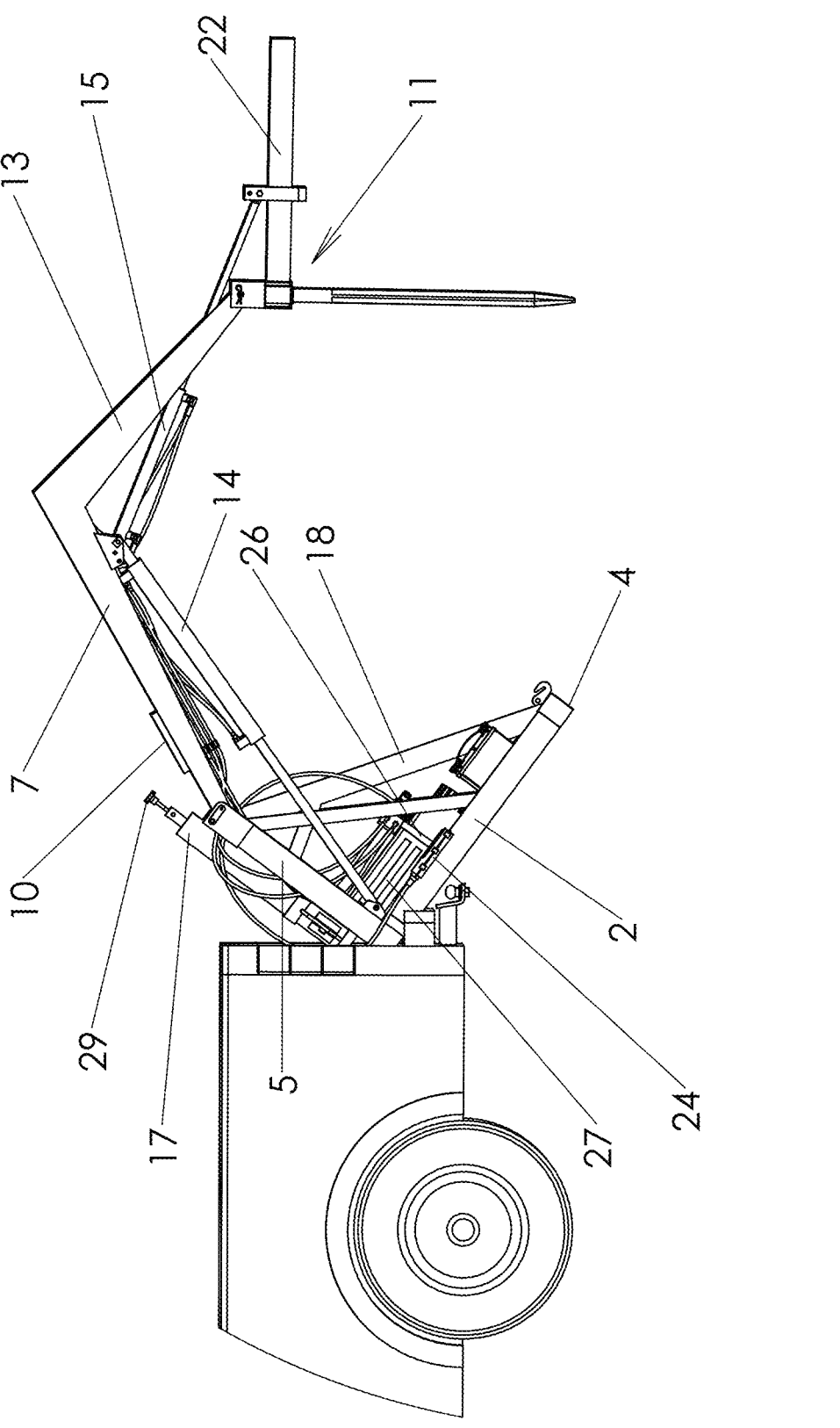
FIG. 13 is a second side view of the present invention shown during the onloading/offloading process.

FIG. 12 is a first side view of the present invention shown during the onloading/offloading process, and FIG. 13 is a second side view of the present invention shown during the onloading/offloading process. The purpose of these two figures is to illustrate how the present invention can be loaded onto and unloaded off of the pickup truck bed without the use of any other equipment. To offload the present invention from the pickup truck bed, the hinge pin 31 is disengaged, and the jack 17 is lifted off of the gooseneck ball 30. Next, the first and second main arms 7, 8 are rotated downward, and the hay loader attachment 11 is rotated downward until the tines of the hay loader attachment make contact with the ground. At that point, the hay loader attachment 11 continues to be rotated in a clockwise direction (from the perspective of FIG. 12), thereby drawing or pulling the frame 1 toward the rear of the truck bed. Next, the vehicle is moved forward, further sliding the frame toward the back of the truck bed and into the position shown in FIG. 12. Next, the main arms 7, 8 are rotated away from the first and second side rails 2, 3 at the same time that the vehicle is moved forward, thereby sliding the loader off of the pickup truck bed and into the position shown in FIG. 13. With both the cross rail 4 and the tines of the hay loader attachment 11 in contact with the ground, the present invention is now stable, and the vehicle can be drive away. To load the present invention onto the pickup truck bed, this same process is followed in reverse order.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A truck bed loader comprising:
   (a) a frame that is configured to fit within a bed of a pickup truck;
      wherein the frame is comprised of a first side rail and a second side rail that are parallel to each other;
      wherein each of the first side rail and the second side rail has a front end and a rear end;
      wherein the front ends of the first and second side rails are connected by a cross rail;
      wherein the frame further comprises a first vertical post and a second vertical post;
      wherein the first vertical post is connected to the rear end of the first side rail at a ninety-degree angle; and
      wherein the second vertical post is connected to the rear end of the second side rail at a ninety-degree angle;
   (b) a first main arm that is rotatably attached to a top end of the first vertical post;
   (c) a second main arm is rotatably attached to a top end of the second vertical post; and
   (d) a first pair of hydraulic cylinders that is configured to lift and lower the first and second main arms;
      wherein the first main arm is comprised of a first leg and a second leg;
      wherein the second main arm is comprised of a first leg and a second leg;
      wherein the first leg is connected to the second leg at a distal end of the first leg and at a proximal end of the second leg;
      wherein a thickness of the first leg increases from a proximal end of the first leg to the distal end of the first leg;
      wherein a thickness of the second leg decreases from the proximal end of the second leg to a distal end of the second leg; and
      wherein the distal ends of the second legs of the first and second main arms are configured to be rotatably attached to various attachments.

2. The truck bed loader of claim 1, wherein the first leg of the first main arm is connected to the second leg of the first main arm at an angle in the range of 100 to 120 degrees; and
      wherein the first leg of the second main arm is connected to the second leg of the second main arm at the same angle at which the first leg of the first main arm is connected to the second leg of the first main arm.

3. The truck bed loader of claim 1, further comprising a second pair of hydraulic cylinders that is configured to rotate the various attachments.

4. A truck bed loader comprising:

(a) a frame that is configured to fit within a bed of a pickup truck;

wherein the frame is comprised of a first side rail and a second side rail that are parallel to each other;

wherein each of the first side rail and the second side rail has a front end and a rear end;

wherein the front ends of the first and second side rails are connected by a cross rail;

wherein the frame further comprises a first vertical post and a second vertical post;

wherein the first vertical post is connected to the rear end of the first side rail at a ninety-degree angle; and wherein the second vertical post is connected to the rear end of the second side rail at a ninety-degree angle;

(b) a first main arm that is rotatably attached to a top end of the first vertical post;

(c) a second main arm is rotatably attached to a top end of the second vertical post; and (d) a first pair of hydraulic cylinders that is configured to lift and lower the first and second main arms;

further comprising a jack that is situated directly behind and welded to the rear support bar;

wherein the jack is configured to raise and lower the frame; and wherein the jack comprises a gooseneck coupler, and the jack is positioned over a gooseneck ball on a floor of the truck bed.

5. The truck bed loader of claim 4, further comprising a central support member that extends from a top of the jack to the cross rail.

6. A truck bed loader comprising:

(a) a frame that is configured to fit within a bed of a pickup truck;

wherein the frame is comprised of a first side rail and a second side rail that are parallel to each other;

wherein each of the first side rail and the second side rail has a front end and a rear end;

wherein the front ends of the first and second side rails are connected by a cross rail;

wherein the frame further comprises a first vertical post and a second vertical post;

wherein the first vertical post is connected to the rear end of the first side rail at a ninety-degree angle; and wherein the second vertical post is connected to the rear end of the second side rail at a ninety-degree angle;

(b) a first main arm that is rotatably attached to a top end of the first vertical post;

(c) a second main arm is rotatably attached to a top end of the second vertical post; and (d) a first pair of hydraulic cylinders that is configured to lift and lower the first and second main arms;

further comprising a chain and a binder that are configured to attach to a rear anchor hook on the cross rail to secure the frame to a trailer hitch on a vehicle.

7. A truck bed loader comprising:

(a) a frame that is configured to fit within a bed of a pickup truck;

wherein the frame is comprised of a first side rail and a second side rail that are parallel to each other;

wherein each of the first side rail and the second side rail has a front end and a rear end;

wherein the front ends of the first and second side rails are connected by a cross rail;

wherein the frame further comprises a first vertical post and a second vertical post;

wherein the first vertical post is connected to the rear end of the first side rail at a ninety-degree angle; and wherein the second vertical post is connected to the rear end of the second side rail at a ninety-degree angle;

(b) a first main arm that is rotatably attached to a top end of the first vertical post;

(c) a second main arm is rotatably attached to a top end of the second vertical post; and (d) a first pair of hydraulic cylinders that is configured to lift and lower the first and second main arms;

further comprising a remote control handheld device that is connected to an electric-hydraulic pump that is powered by a battery;

wherein a solar panel is configured to charge the battery;

wherein the remote control handheld device is configured to control the electric-hydraulic pump; and wherein the electric-hydraulic pump is configured to control the first and second pairs of hydraulic cylinders.

\* \* \* \* \*